United States Patent
Chen et al.

(10) Patent No.: US 7,346,609 B2
(45) Date of Patent: Mar. 18, 2008

(54) STREAMING XPATH ALGORITHM FOR XPATH VALUE INDEX KEY GENERATION

(75) Inventors: Yao-Ching Stephen Chen, Saratoga, CA (US); Irene Ching-Hua Liu, San Jose, CA (US); Demai Ni, Davis, CA (US); Guogen Zhang, San Jose, CA (US); Qinghua Zou, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 10/990,834

(22) Filed: Nov. 16, 2004

(65) Prior Publication Data

US 2006/0106758 A1    May 18, 2006

(51) Int. Cl.
*G06F 17/30* (2006.01)

(52) U.S. Cl. .................. 707/3; 707/2; 707/6; 707/100; 715/514; 715/516

(58) Field of Classification Search ................ 707/100, 707/2, 3, 6; 715/516, 514
See application file for complete search history.

(56) References Cited

U.S. PATENT DOCUMENTS

| | | | |
|---|---|---|---|
| 2003/0120978 A1 | 6/2003 | Fabbrizio et al. ............. 714/38 |
| 2003/0163285 A1* | 8/2003 | Nakamura et al. .......... 702/179 |
| 2003/0212664 A1 | 11/2003 | Breining et al. ............... 707/3 |
| 2004/0010752 A1* | 1/2004 | Chan et al. .................. 715/513 |
| 2004/0103105 A1 | 5/2004 | Lindblad et al. ............. 707/100 |
| 2004/0167864 A1* | 8/2004 | Wang et al. .................... 707/1 |
| 2005/0055334 A1* | 3/2005 | Krishnamurthy ............... 707/2 |

\* cited by examiner

*Primary Examiner*—Don Wong
*Assistant Examiner*—Andalib Lodhi
(74) *Attorney, Agent, or Firm*—Sawyer Law Group LLP (57) ABSTRACT

A method generates hierarchical path index keys for single and multiple indexes with one scan of a document. Each data node of the document is scanned and matches to query nodes are identified. A data node matches a query node if the three conditions hold: if it is not the root step, there is a match for the query node in the previous step of the query; the data node matches the query node of the current step; and the edges of the data and query nodes match. A sub-tree of a data node can be skipped if the data node is not matched and its level is less than the fixed levels of the query. The matched data node is then placed in the match stacks corresponding to the match query nodes. The method uses transitivity properties among matching units to reduce the number of states that need to be tracked and to improve the evaluation of path expressions significantly.

4 Claims, 9 Drawing Sheets

//Match an XNode
//Input: XNode n (name: the name of the XNode, level: the level of depth )
//Output: isOut: true if output; isSkip: true if we can skip all its descendants
void Match(XNode n, bool* isOut, bool* isSkip)
1  Clear *matchStack*:pop off *mUnit* if *mUnit.level*>=*n.level* and update the *top* of *qNodes[mUnit.QNid]*;
2  if (*n.level* < *fixLevelSteps*)
3      if *n.name* does not match *QNode* of the current step, set *isSkip* and return;
4      if output step matched, set *isSkip* and *isOut* and return;
5      Add a *mUnit* into *matchStack* and update *qNodes*[step].*top*(step = n.level here);
6      return;
7  if (fixed level step not matched) return;
8  *prevStepLevel* = -1 if no fixed level steps; otherwise set to the level of the previous fixed level step top *mUnit*;
9  for(*step=fixLevelSteps*; *step<qLen*; *step++*)
10     q = *qNodes[step]*;
12     if (*q.top*>=0) *thisStepLevel* = *matchStack[q.top].level*; otherwise -1;
12     if (*n* matches *q* using *prevStepLevel*)
13         Add a *mUnit* into *matchStack* and update *qNodes[step].top*;
14     *prevStepLevel* = *thisStepLevel*;
15     if (*prevStepLevel* < 0) break;
16 if (*step* points to the output qNode)
17     if (matching), set *isOut* to true;
18 return;

FIG. 4A

```
// Global variables:
//   matchStack: array representation of grid of matching units
//   qNodes:     array representation of query nodes
//   idx:        the list of pairs (val, nid) for indexing
void QuickXScan(Document d) {
    bool isOut, isSkip;

TraversalControlBlock c=getControlBlock(d);
    getRoot(c) and match with the root step;
    while(not EndOfDocument(c)) {
        while(n = getFirstChild(c) && FOUND(c) ) {
            Match(n, &isOut, &isSkip);
            if(*isOut) idx.add(n.val, n.nid);   // optional RID can be added
            if(*isSkip) break;
        }
        // get to a leaf at this point
        // loop until getting a sibling, when no sibling, the position will go up to the parent node
        Loop1: while(n=getNextSibling(c) && NOTFOUND(c));
            Match(n, &isOut, &isSkip);
            if(*isOut) idx.add(n.val, n.nid);   // optional RID can be added
            if(*isSkip) goto Loop1;
    }
}
```

FIG. 4B

XPath Expressions

| Q1 | /a/c//b/d |
| Q2 | /a/c//d//c |
| Q3 | /a/b/d |
| Q4 | /a//d |
| Q5 | /a/b//c |
| Q6 | /a/c//d/b |

FIG. 5A

QNodes Array 501

| | ChdNodes | DescNodes |
|---|---|---|
| 0 | (a, 1) | |
| 1 | (b, 2), (c, 3) | (d, 11) |
| 2 | (d, 7) | (c, 6) |
| 3 | | (b, 4), (d, 5) |
| 4 | (d, 8) | |
| 5 | (b, 9) | (c, 10) |

Output Streams Table 502

| | Output streams |
|---|---|
| 6 | Output stream for Q1 |
| 7 | Output stream for Q2 |
| 8 | Output stream for Q3 |
| 9 | Output stream for Q4 |
| 10 | Output stream for Q5 |
| 11 | Output stream for Q6 |

Sample document tree (D1): a1 <- c2 <- d3 <- b4 <- d5

Stack Top Table 503

| | StackTop |
|---|---|
| 0 | 0 |
| 1 | 1 |
| 2 | -1 |
| 3 | 2 |
| 4 | 6 |
| 5 | 8 |

Match Stack Table 504

| | Level | QNid | Previous |
|---|---|---|---|
| 0 | 0 | 0 | -1 |
| 1 | 1 | 1 | -1 |
| 2 | 2 | 3 | -1 |
| 3 | 3 | 11 | |
| 4 | 3 | 5 | -1 |
| 5 | 4 | 9 | |
| 6 | 4 | 4 | -1 |
| 7 | 5 | 8 | |
| 8 | 5 | 5 | 4 |
| 9 | 5 | 11 | |
| | | | |

STREAMING XPATH ALGORITHM FOR XPATH VALUE INDEX KEY GENERATION

FIELD OF THE INVENTION

The present invention relates to path value indexes, and more particularly to the key generation for path value indexes for data processing.

BACKGROUND OF THE INVENTION

XML databases are well known in the art. For XML databases, XPath is a language for accessing XML documents in the database. Its value indexes are of particular interest since they can be used to answer a large set of XPath queries efficiently. Typically, XML documents are stored according to a tree data model, such as XQuery data model or Document Object Model (DOM). The nodes of the data tree are streamed and scanned. The XPath is then evaluated and a result which satisfies the XPath query is returned.

Conventional approaches of processing XPath queries on XML data streams however have the following problems:

They process only one XPath expression at a time. At the database system level, an XML document may have many value indexes, each of them corresponding to an XPath expression. Conventional approaches require multiple scans of the XML document to build the value indexes, which is not efficient.

They explicitly express all the possible matching paths for an input XML node in their state machines or working buffers, which is not efficient since the number of matching paths can be very large in some situation.

*They passively process every input node or event and do not or cannot skip uninterested XML sub-trees.

*For every XML node, they expect two events, OPEN and CLOSE. While this assumption is reasonable when an XML document is stored as character large objects (LOB), composing the two events for an XML node is expensive when an XML document is stored into records.

Accordingly, there exists a need for an improved method for generating hierarchical path value index keys. The method should process XPath expressions efficiently and require one scan of an XML document, both for single and multiple indexes. The present invention addresses such a need.

SUMMARY OF THE INVENTION

A method generates hierarchical path index keys for single and multiple indexes with one scan of a document. Each data node of the document is scanned and matches to query nodes are identified. A data node matches a query node if the three conditions hold: if the current step is not the root, there is a match for the query node in the previous step of the query; the data node matches the query node of the current step; and the edges of the data and query nodes match. A sub-tree of a data node can be skipped if the data node is not matched and its level is less than the fixed levels of the query. The matched data node is then placed in the match stacks corresponding to the match query nodes. The method uses transitivity properties among matches to reduce the number of states that need to be tracked and to improve the evaluation of path expressions significantly.

2

DETAILED DESCRIPTION

The present invention provides improved method for generating hierarchical path value index keys. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention generates hierarchical path value index keys for single and multiple indexes. The method uses transitivity properties among matches to reduce the number of states that need to be tracked and to improve the evaluation of path expressions significantly. The matches between query nodes and data nodes are organized as a matching grid. For a path and a data node that is a single thread of nested nodes, the matching grid is a concise representation of matching instantiations, listed in a table. A sub-tree of a data node may be skipped if the data node is not matched.

To more particularly describe the features of the present invention, please refer to FIGS. 1 through 7 in conjunction with the discussion below.

Although the embodiments below are described in the context of XML documents and XPath, any hierarchical data and query language with similar characteristics to XPath can be used without departing from the spirit and scope of the present invention.

Figure 1:
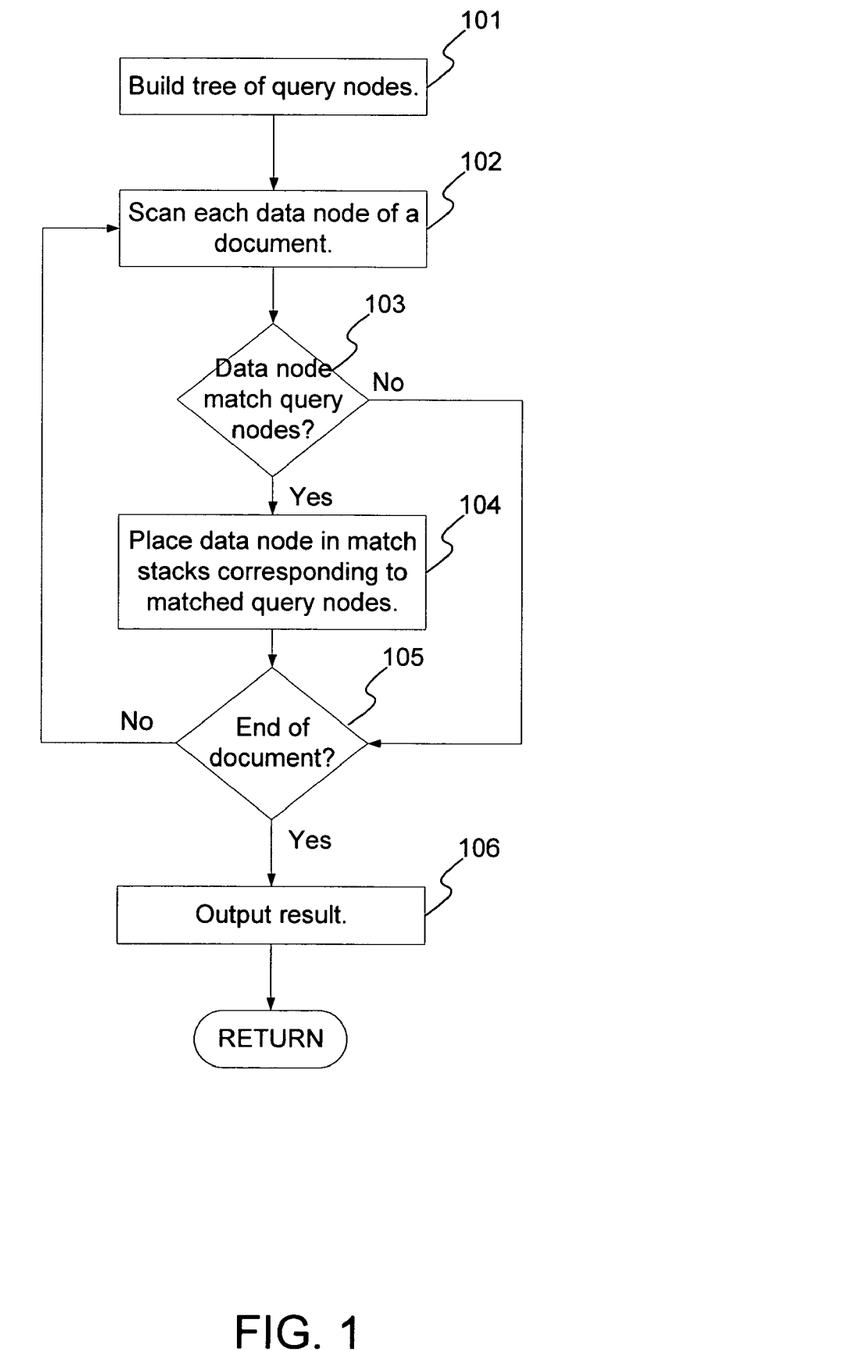
FIG. 1 is a flowchart illustrating an embodiment of a method for generating hierarchical path value index keys in accordance with the present invention.
Figure 3:
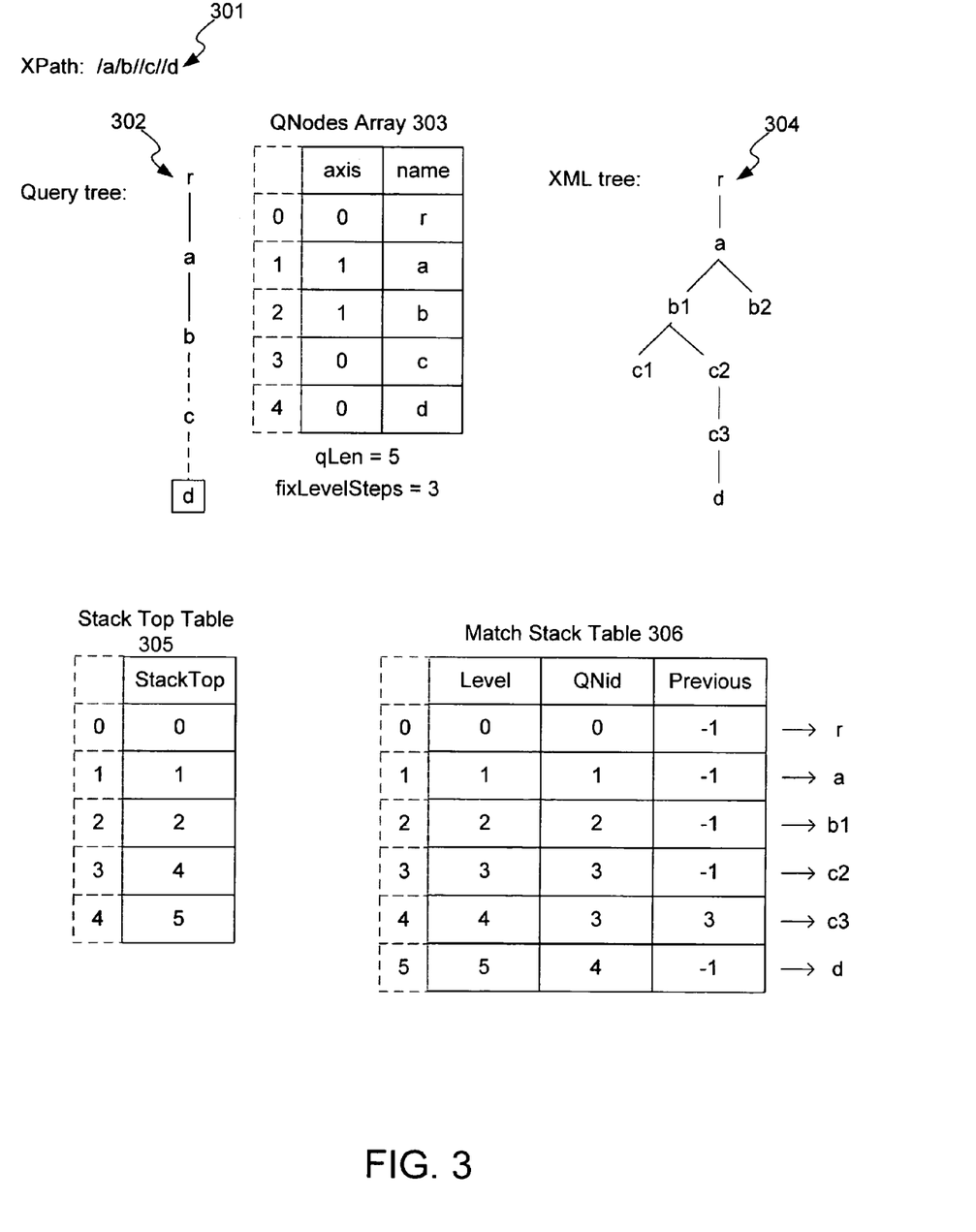
FIG. 3 illustrates an example of the processing of a single index XPath expression in accordance with the present invention.

FIG. 1 is a flowchart illustrating an embodiment of a method for generating hierarchical path value index keys in accordance with the present invention. An XPath value index is defined using an XPath expression. First, a tree of query nodes for an XPath expression is built, via step 101. FIG. 3 illustrates an example query tree 302 for an XPath expression 301. The XPath expression includes a child ("/") and descendant ("//"), or descendant-or-self, axes.

In the query tree 302, each query node ("QNode") corresponds to a "step", and a link between two nodes represents the relationship between the two steps—either parent-child (PC) or ancestor-descendant (AD) relationship. In a graphical representation, a solid line is used to represent a PC relationship and a dotted line for an AD relationship. The query tree 302 for the XPath expression 301 is a single straight path without any branches. When there is no "//" step above a step, the step is referred to as a "fixed level step" because only data nodes at a fixed level can match the query node.

Once the query tree 302 is built, each data node of an XML document is scanned, via step 102. In this embodiment, XML data nodes are scanned sequentially in document order. As each data node is visited, its name, level (depth), node ID, and value can be read.

Next, it is determined if the data nodes match the query nodes, via step 103. The matching is described further below with reference to FIG. 2. If they do match, then the data node is placed in match stacks corresponding to the matched query nodes, via step 104. Steps 102 through 104 are then repeated for the next data node until the end of the document is reached, via step 105. Once the processing completes, the result is outputted, via step 106.

In this embodiment, an array is used to store the query tree structure. FIG. 3 illustrates a QNodes array 303 for the example path expression "/a/b//c//d", where the 0 and 1 in the axis column represent a descendant axis and a child axis respectively. The fixed level steps ("fixLevelSteps") for the query tree 302 is the number of steps that have child axis all the way to the root node, r. Here, the fixLevelSteps equals 3. The root node can be implicit rather than explicitly represented.

To represent matches, a logical stack or list of matching units is associated with each query node. Each matching unit contains a data node that matches with the query node, and the data nodes of the matching units in a stack have AD relationships among themselves.

*The information contained in a matching unit includes:
*Level: the depth of the matched XML data node.
*QNid: the query node ID of the matched query node.
*Previous: the previous unit containing a node that matches with the same query node.

The matching units are stored in a match stack table 306. A stack top table 305 stores the addresses of the top matching units of logical stacks in the match stack table 306 for each query node. If an XPath expression contains PC relationships only, then the stacks contain at most one entry each. Multiple entries in a stack occur for a query node that is at or below an AD step. For some matching units across the neighboring stacks, there are also relationships that are either PC or AD corresponding to the query steps. The matching units thus form a matching grid.

The matching grid can be represented by one combined stack or an array of stacks, one for each query node. Using an array would eliminate the cost of maintaining multiple stacks and improve locality during processing.

A data node matches a query node if the following three conditions hold: (1) if the query node is not the root step (the root step matches the document root), then there is a match for the query node in the previous step of the query; (2) the data node matches the query node of the current step (i.e., the node names match); and (3) the edges of the data and query nodes match. If the relationship between the query node of the current step and the query node of its previous step is a PC relationship, then condition (3) is satisfied if the level of the data node is the same as the level of the matching unit in the previous step plus one. If the relationship is an AD relationship, then condition (3) is satisfied if the level of the data node is greater than the level of the data node of the matching unit in the previous step.

Figure 2:
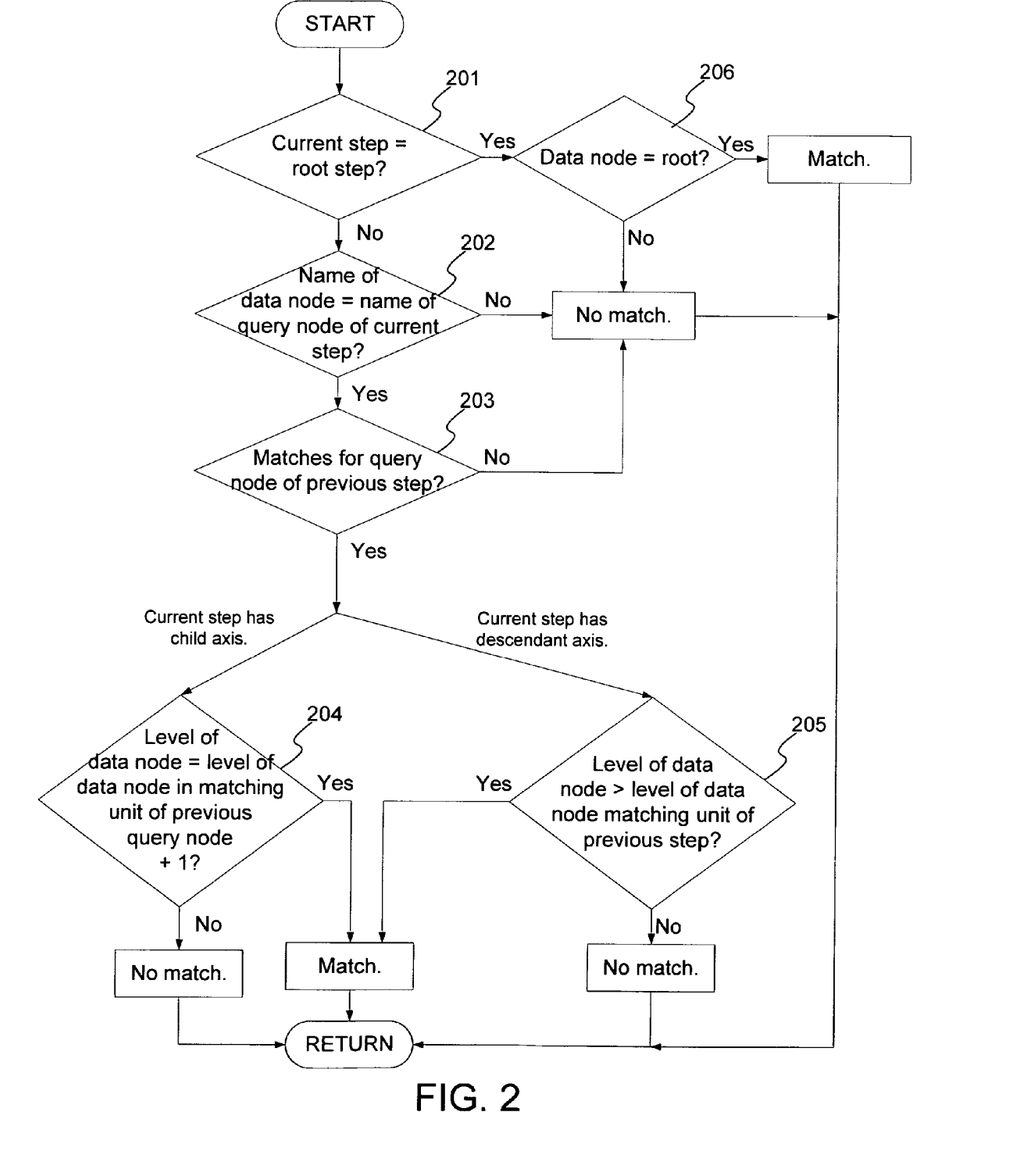
FIG. 2 is a flowchart illustrating in more detail the matching of the data nodes and query nodes in accordance with the present invention.

FIG. 2 is a flowchart illustrating in more detail the matching of the data nodes and query nodes in accordance with the present invention. First, it is determined if the current step is the root step, via step 201. If it is, and the data node is a root node, via step 206, then there is a match. Otherwise there is no match. If the current step is not the root step, then it is determined if the name of the data node is the same as the name of the query node of the current step, treating any name the same as a wildcard, via step 202. If they are not the same, then there is no match. If they are the same, then it is determined if the query node of the previous step had any matches, via step 203. If it has no matches, then there is no match. If it has matches, and the query nodes of the previous step and the current step is a PC relationship, then it is determined if the level of the data node equals the level of the data node in the matching unit of the previous step plus one, via step 204. If they are not equal, then there is no match. If they are equal, then the data and query nodes match.

Returning to step 203, if the query node of the previous step has matches and the relationship between the query nodes of the previous step and the current step is an AD relationship, then it is determined if the level of the data node is greater than the level of the data node matching unit of the previous step, via step 205. If it is not greater, then there is no match. If it is greater, then the data and query nodes match.

FIG. 3 illustrates an example of the processing of a single index XPath expression in accordance with the present invention. Here, the XPath expression 301 is /a/b//c//d. The query tree 302 is a graphical representation of the XPath expression. In this embodiment, the query tree 302 is stored as a QNodes array 303. The query length (qLen) is 5, and the fixLevelSteps is 3. For the matching of the example XML data represented by the XML tree 304, the stack top table 305 and match stack table 306 result when the traversal is at d data node. Each row of the match stack table 306 represents a data node that matches the query. Here, nodes r, a, b1, c2, c3, and d satisfy the query. The level, the query node ID, and the entry of the previous matching data node are stored in each row. For example, data node c3 matches because it is a child of node c2, and node c2 matches. Thus, the pointer in the "previous" column is "3" for c3's row. The stack top table 305 stores pointers to the top of each query node stack. The entries in the stack top table 305 are updated as each matching unit is identified and added to the match stack table 306.

For example, first the data node (r) is compared with the query root step r. Here, the level of the data is 0, and the query node id is 0. First, it is determined that the current step is the root step, via step 201. It is then determined that the data node is also root, via step 206. Thus the data node and the query node match. With a match, information concerning the data node (r) is pushed onto the match stack table 306. The information includes the level of the data node (0), the query node id (0), and the previous match entry (−1).

Next, the data node (a) is compared with the query node (a). Here, the level of the data node is 1, and the query node id is 1. First, it is determined that the current step is not the root step, via step 201. Then it is determined that the name of the data node (a) is the same as the name of the query node (r), via step 202. So it is next determined if there are matches in the query node of the previous step (r), via step 203. As described above, the query node (a) does have a match, and the current query step has a child axis. Thus, the process continues at step 204. At step 204, it is determined that the level of the data node (1) is equal to the level of the data node in the matching unit of the previous step (0) plus one. Thus, the data node and the query node match. With a match, information concerning the data node (a) is pushed onto the match stack table 306. This information includes the level of the data node (1), the query node ID (1), and the previous match entry (−1). The stack top for the query node ID (1) in the stack top table 305 is also updated to 1, so that it points to the stack top for the current query node (a).

Next, the data node (b1) is compared with the query node (b). Here, the level of the data node is 2, and the query node id is 2. First, it is determined that the current step is not the root step, via step 201. Then it is determined that the name of the data node (b1) is the same as the name of the query node (b), via step 202. So it is next determined if there are matches in the query node of the previous step (a), via step 203. As described above, the query node (a) does have a match, and the query node of the current step (b) is a child of the query node (a). Thus, the process continues with step 204. At step 204, it is determined that the level of the data node (2) is equal to the level of the data node in the matching unit of the previous step (1) plus one. The data node and the query node thus match. With a match, the level of the data node (2), the query node ID (2), and the previous match entry (−1) are pushed onto the match stack table 306. The stack top for the query node ID (2) in the stack top table 305 is also updated to 2, so that it points to the stack top for the current query node (b).

Next, the data node (c2) is compared with the query node (c). Here, the level of the data node is 3, and the query node id is 3. First, it is determined that the current step is not the root step, via step 201. Then it is determined that the name of the data node (c2) is the same as the name of the query node (c), via step 202. So it is next determined if there are matches in the query node (b) of the previous step, via step 203. As described above, the query node (b) does have a match, and the query node of the current step (c) has a descendant axis. Thus, the process continues with step 205. At step 205, it is determined that the level of the data node (3) is greater than the level of the data node matching unit of the previous step (2) (b1 is the matching unit). The data node and the query node thus match. With a match, the level of the data node (3), the query node ID (3), and the previous match entry (−1) are pushed onto the match stack table 306. The stack top for the query node ID (3) in the stack top table 305 is also updated to 3, so that it points to the stack top of the current query node (c).

Next, the data node (c3) is compared with the query node (c). Since the query node (c) has a descendant axis, more than one match can occur for query node (c). Here, the level of the data node is 4, and the query node id is 3. First, it is determined that the current step is not the root step, via step 201. Then it is determined that the name of the data node (c3) is the same as the name of the query node (c), via step 202. So it is next determined if there are matches in the query node (b) of the previous step, via step 203. As described above, the query node (b) does have a match, and the query node of the current step (c) has a descendant axis. Thus, the process continues with step 205. At step 205, it is determined that the level of the data node (4) is greater than the level of the data node matching unit of the previous step (3) (b1 is the matching unit). The data node and the query node thus match. With a match, the level of the data node (4), the query node ID (3), and the previous match entry (3) are pushed onto the match stack table 306. Here, the previous match entry is 3 because the data node (c2) was the stack top for the query node (c). Thus, on the stack for query node (c), data node (c3) points to data node (c2), while data node (c2) points to −1 to indicate that it is at the bottom of the stack. The stack top for the query node ID (3) in the stack top table 305 becomes 4.

Next, the data node (d) is compared with the query node (d). First, it is determined that the current step is not the root step, via step 201. Then it is determined that the name of the data node (d) is the same as the name of the query node (d), via step 202. So it is next determined if there are matches in the query node (c) of the previous step, via step 203. As described above, the query node (c) does have matches, and the query node of the current step (d) is a descendant axis. Thus, the process continues with step 205. At step 205, it is determined that the level of the data node (5) is greater than the level of the matching unit of the previous step (4) (c3 is the matching unit). The data node and the query node thus match. With a match, the level of the data node (5), the query node ID (4), and the previous match entry (−1) are pushed onto the match stack table 306. The data node (d) is the output so it is placed onto the output stream.

Figure 4A:
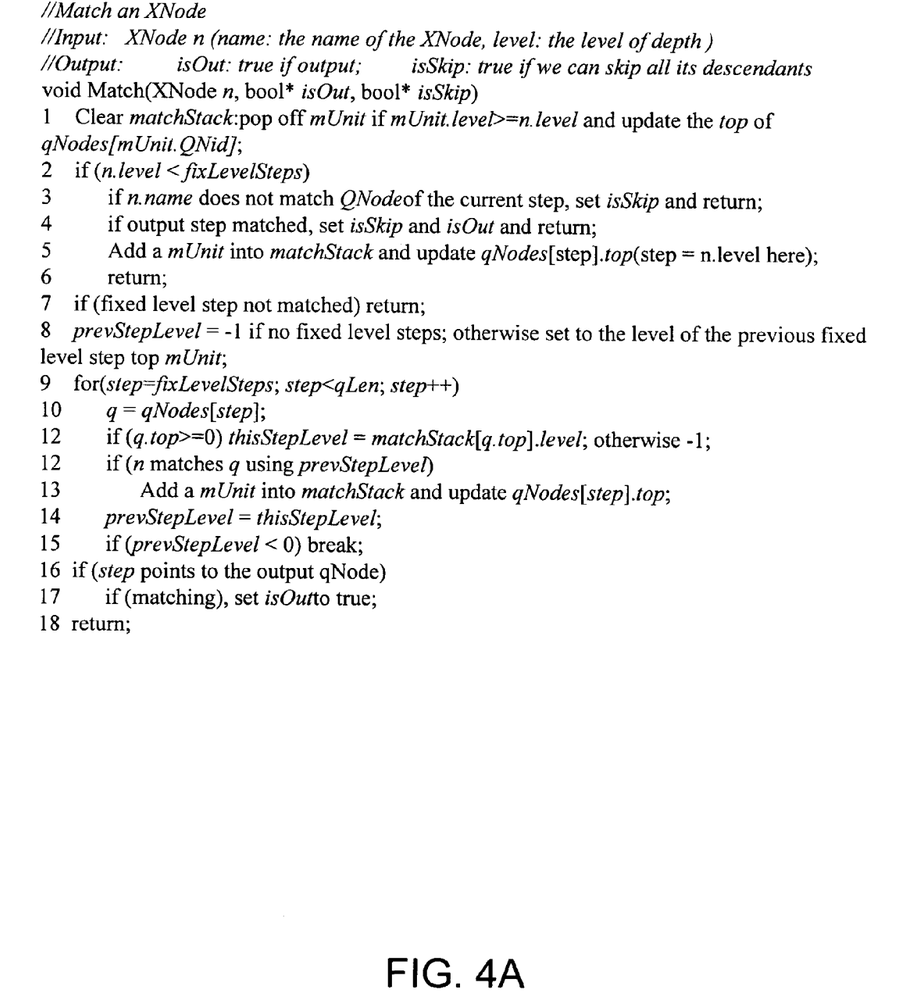
FIGS. 4A and 4B illustrate example pseudo-code for the matching and the key generation, respectively, in accordance with the present invention.
Figure 4B:
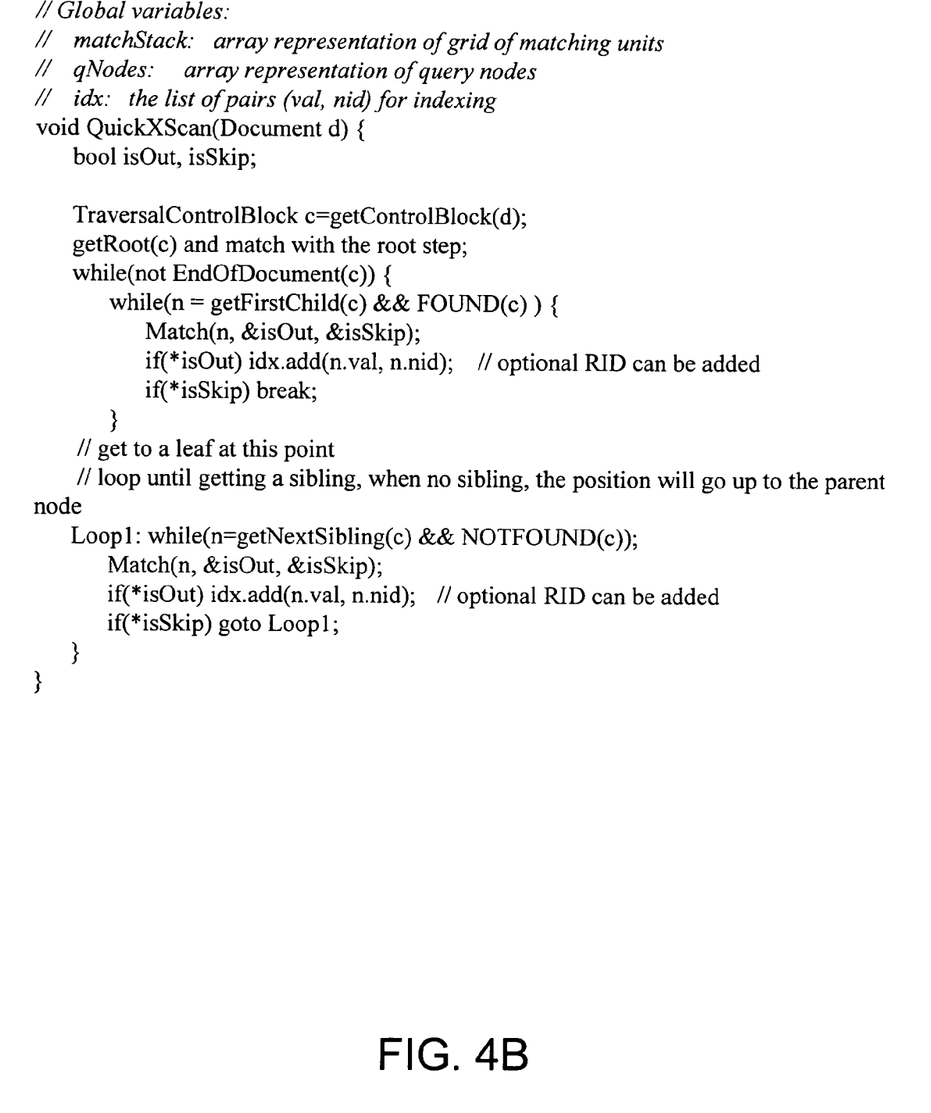

FIGS. 4A and 4B illustrate example pseudo-code for the matching and the key generation, respectively, in accordance with the present invention. The matching logic in FIG. 4A receives as input the name of the data node (n) and its level of depth (n.level). It adds a matching unit (mUnit) to the match stack (matchStack) for a current query node (QNode) if the above described three conditions are met. It further updates the stack top pointer to the top of the stack (QNodes[ ].top). If the data node does not satisfy any one of the three conditions, then it does not match with the query. If the level of the data node is less than the fixLevelSteps, then is Skip is set to true to indicate that the descendants of the data node can be skipped as by definition they also will not match the query node. If the current node matches and the current query node is an output node, then is Out is set to true. The above matching logic is called by the key generation logic illustrated in FIG. 4B.

Figure 5A:
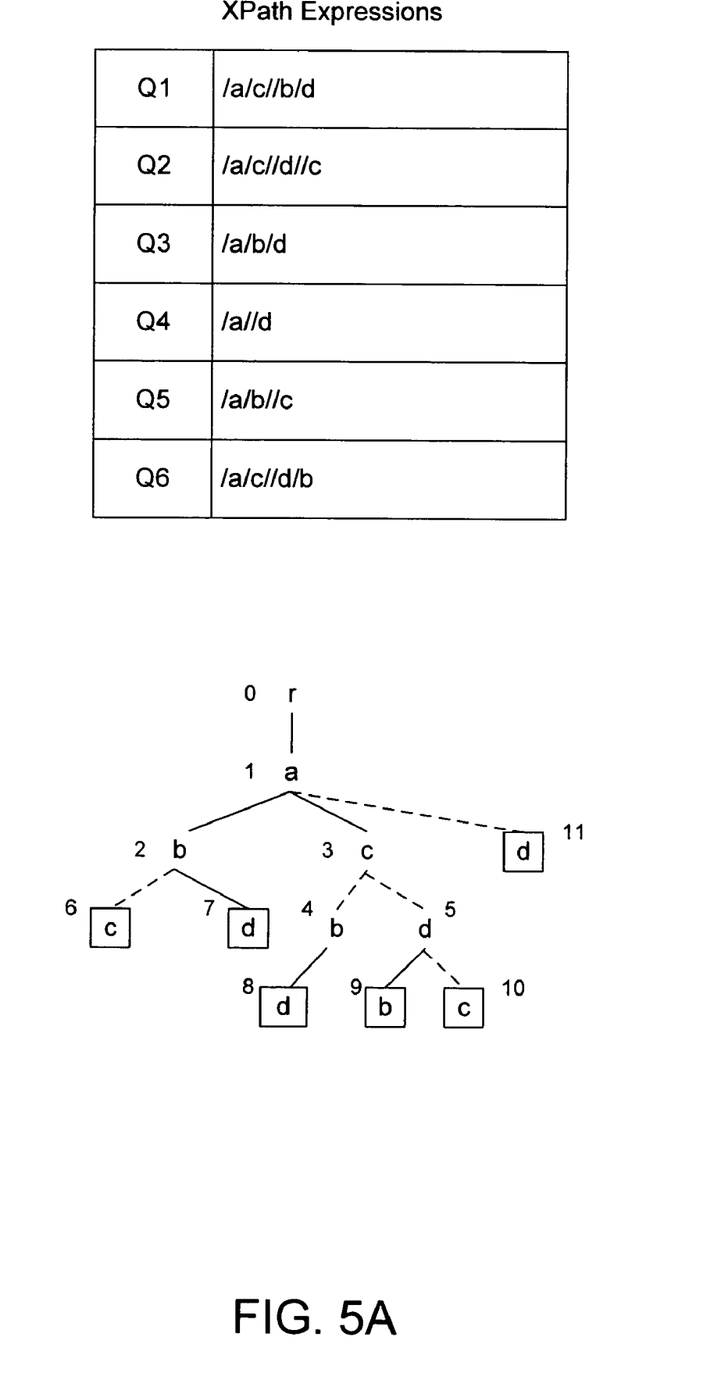
FIG. 5A illustrates an example set of six path expressions used for indexes on an XML column and their combined tree representation.

In addition to processing XPath expressions for a single index, the method can also process combined multiple XPath expressions and generate index keys in one scan. FIG. 5A illustrates an example set of six path expressions used for indexes on an XML column. A simple way to maintain the indexes is to do one index at a time. However, this would require the document to be scanned six times, once for each index, which is very inefficient.

Figure 5B:
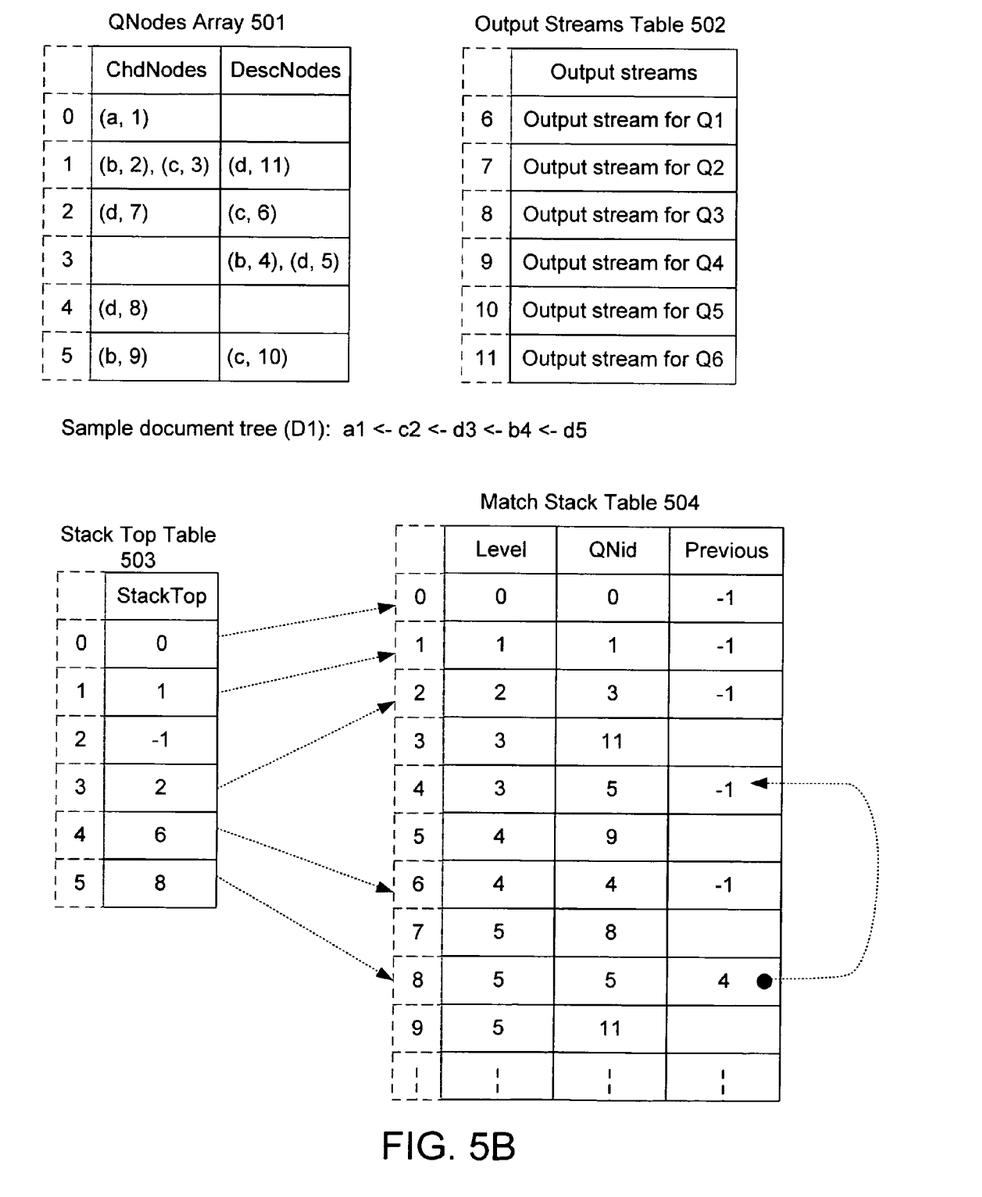
FIG. 5B illustrates the data structures for the example XPath expressions in FIG. 5A and a sample document tree.

The method in accordance with the present invention addresses this problem by first compiling the set of path expressions into a tree. For example, for the six path expressions shown at the top of FIG. 5A, a tree shown at the bottom of FIG. 5A can be constructed. Node r represents the root step of an XPath expression. The internal nodes are consecutively numbered by their pre-order sequence numbers (ids), as is known in the art. The leaf nodes can then be numbered in a similar manner. A leaf node that corresponds to a query node is marked in a square. By building such a tree, the shared nodes are grouped, reducing the total number of nodes. FIG. 5B illustrates the QNode array 501 for the example XPath expressions and the output stream array 502. Each leaf node is associated with an output stream, as shown in the Output Streams Table 502. For the sample document tree (D1), a1 ←c2←d3←b4←d5, the stack top table 503 and match stack table 504 result.

As in the single index case, each internal query node is associated with a stack that stores information about the matched data nodes when scanning an XML stream. In the stack top table 503, for each internal query node there is a pointer that points to the latest matched entry in the match stack table for the node, which matched the internal query node. For example, in the stack top table 503, StackTop[5]= 8, meaning that MatchStack[8] matches the internal query node 5. The MatchStack table 504 stores a {0} entry for level 0, one entry{1} for level 1, one entry {2} for level 2, two entries {3, 4} for level 3, two entries {5,6 } for level 4, and three entries {7,8,9} for level 5.

The QNodes array 501 captures the information of the tree in FIG. 5A. Each internal query node corresponds to one entry in QNodes. The first column (ChdNodes) lists the query nodes to which there are solid edges, that is, with a child axis. If an edge is a dotted line, that is, with a descendant axis, the corresponding node is placed in the second column (DescNodes). For example, query node 1 has solid lines to query node 2 (with name b) and query node 3 (with name c) and has a dotted line to query node 11 (with name d). Thus, the entry for QNodes 1 include ChdNodes= {(b,1), (c,2)} and DescNodes={(d, 11)}.

When the query tree is large, such as the tree in FIG. 5A that has 100 path expressions, it is inefficient to test the three conditions for all the internal query nodes when a data node arrives. To optimize the matching process for such a case, the active states for the queries are maintained. A query node is "active" if it can potentially match the next data node in the XML stream. The set of active query nodes is called active states (AS). A query node is "direct" if the edge to its previous step is a solid line (PC relationship). Otherwise, it is "indirect". The active states are divided into two sets accordingly. For example, for the tree in FIG. 5A, the query nodes 1, 2, and 3 are direct and the query nodes 4 and 5 are indirect. The direct active states, once matched, may become inactive, while the indirect active states will continue to be active after their matchings.

Table 1 below shows the logic of maintaining the direct active states. The next direct states are the union of direct query nodes of the current matched query nodes. When adding a data node, the set of matches (M) is first calculated. Then, the union of the direct nodes of the query nodes in M is obtained to get the resulting direct states. When removing matches from the stack, the most recent matches, i.e., the matches at the top of the stack with the largest level, can be obtained from the match stack table 504.

TABLE 1

Logic of maintaining direct active states

| Event | Initial States | Action | Next direct states |
|---|---|---|---|
| Add Node n | ds0: direct | Get a list M of matches | Union of direct nodes of each query node in M → ds1 |
| Remove matches | inds0: indirect | Let M be list of matches of largest level | |

Table 2 shows the logic of maintaining the indirect active states. An indirect query node is active only if the query node of the previous step has some matches. Thus, the stack of a query node is checked. If it is empty before adding a match, then its indirect nodes are activated. If it is empty after removing a match, then its indirect nodes are deactivated.

TABLE 2

Logic of maintaining indirect active states

| Event | Initial States | Action | Next indirect states |
|---|---|---|---|
| Add a match to stack S of qid | ds0: direct inds0: indirect | Check if S is empty before adding match | If yes, add indirect nodes of qid into inds0 → inds1 |
| Remove match from stack S of qid | | Check if S is empty after removing match | If yes, remove indirect nodes of qid from inds0 → inds1 |

Since the logics for maintaining direct and indirect active states are different, two hash tables (or other associative memory) are used to keep track of the active states: a direct AS hash table for maintaining the direct active query nodes, and an indirect AS hash table for maintaining the indirect active query nodes.

Figure 6:
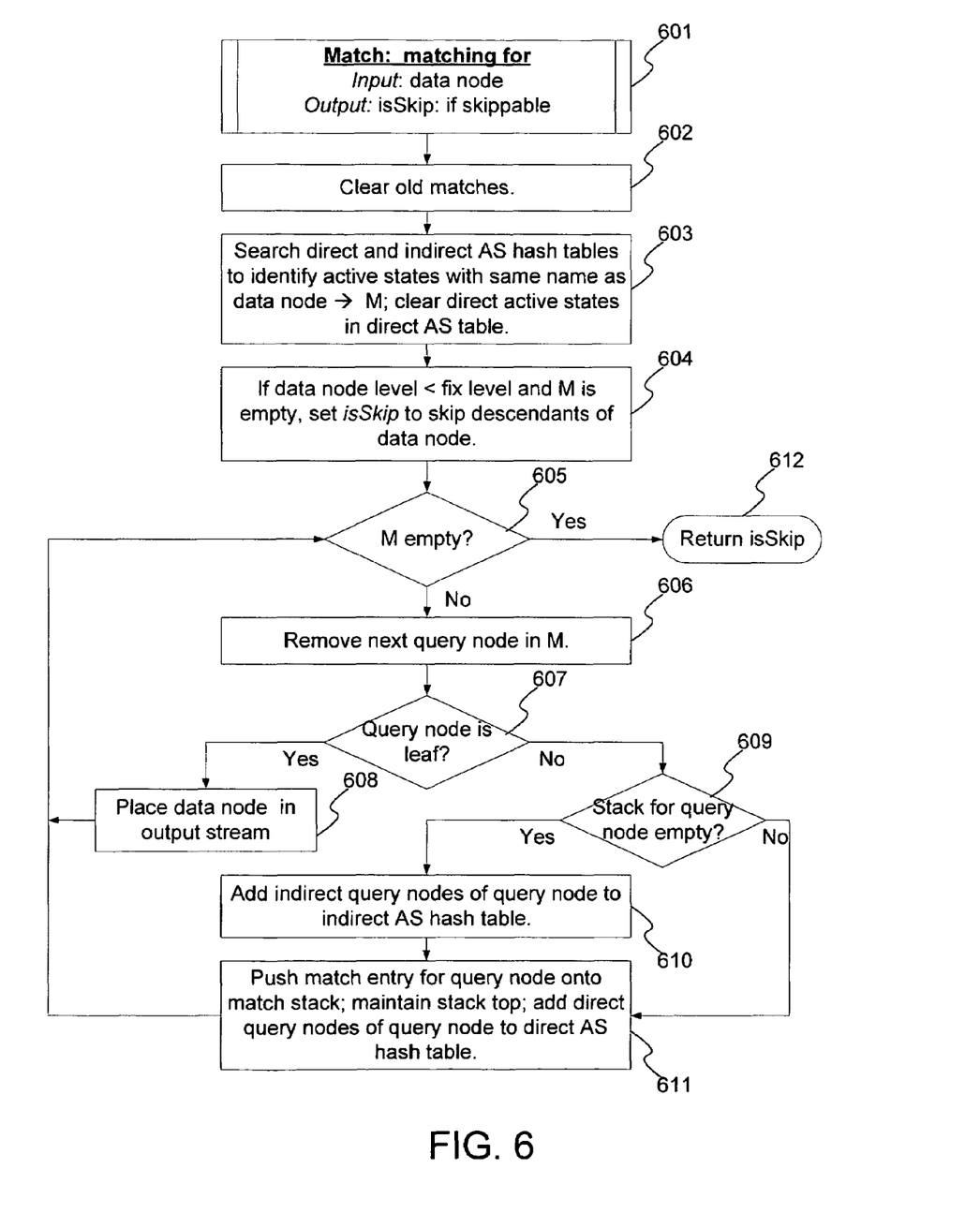
FIG. 6 is a flowchart illustrating the matching process for multiple indexes in accordance with the present invention.

FIG. 6 is a flowchart illustrating the matching process for multiple indexes in accordance with the present invention. Here, the data node is an input parameter, and is Skip is an output to indicate if the descendant of the data node can be skipped or not, via step 601. First, the old matches are cleared, via step 602. The matches in the stacks that are not ancestors of the data node are removed. Matches in stacks of levels less than or equal to the level of the data node are removed. Their active states are also updated. The clear logic is further described below with reference to FIG. 7.

Next, the direct and indirect AS hash tables are searched to identify the direct active states with the same name as the data node, via step 603. These are then merged together in descending order of query nodes, which is stored in M. M thus is the list of active query nodes with the same name as the data node. Also, the direct active states in the direct AS hash table are cleared. This is because for direct active states, there could be no further matches.

Next, if the level of the data node is less than the fixed levels and M is empty, then isStep is set to skip descendants of the data node, via step 604. The fixed levels in the multiple XPath expression cases is defined as the minimum of all fixLevelSteps for the queries. If there are no matches, i.e., M is empty, via step 605, then isSkip is returned, via step 612.

If M is not empty, then the next query node in M is removed, via step 606. If the query node is a leaf node, via step 607, then it is an output. Thus, the data node is placed into the output stream, via step 608, rather than placed on the stack. If the query node is not a leaf node, then it is determined if the stack top for the query node is empty, via step 609. If so, then the indirect query nodes of the query node are added to the indirect AS hash table, via step 610, since this would be the first time the query node had a match.

Next, the match entry for the query node is placed or pushed onto the match stack, via step 611. The stack top of the query node is also maintained, and its direct nodes are then added to the direct AS hash table.

Figure 7:
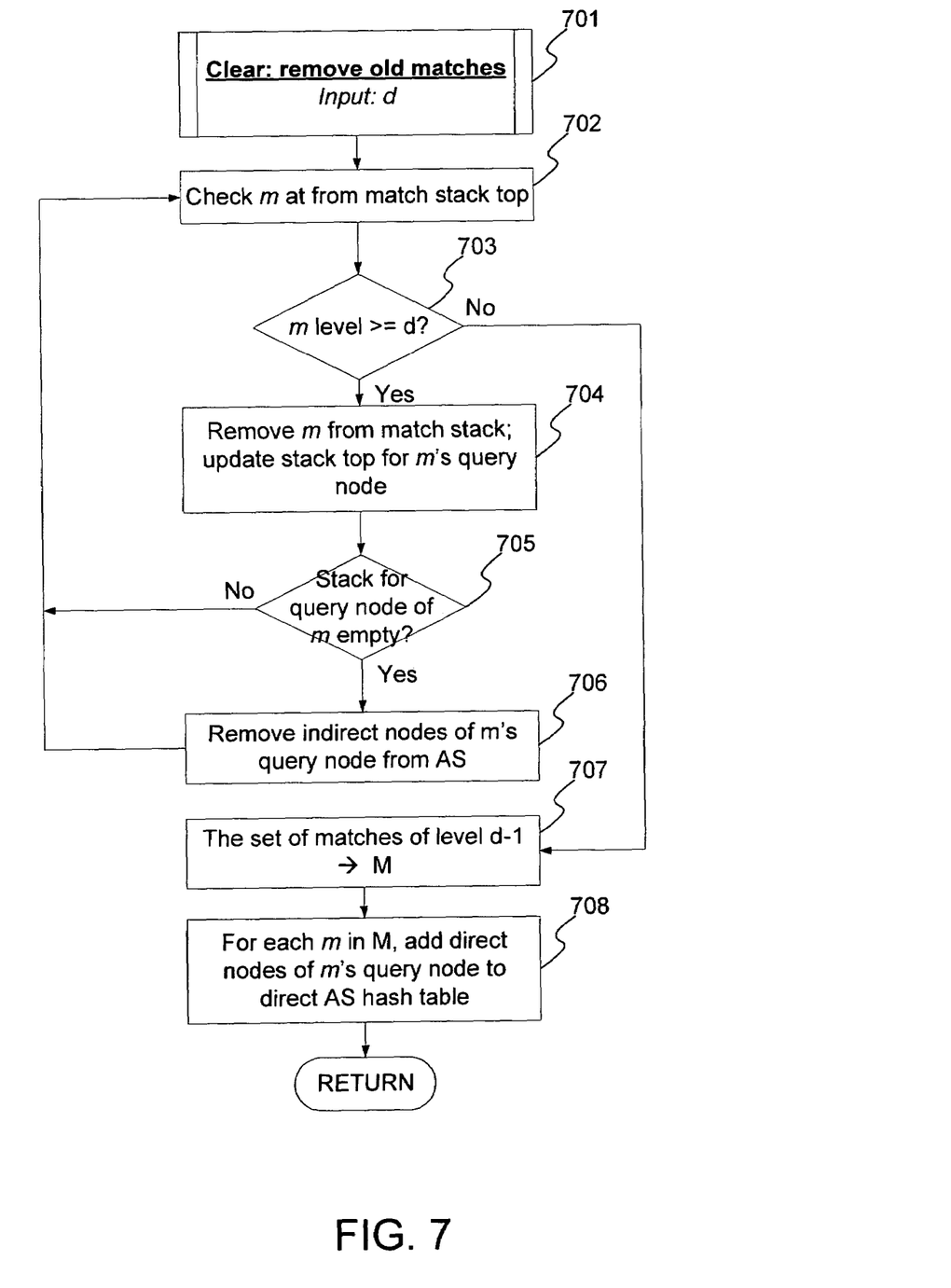
FIG. 7 is a flowchart illustrating an embodiment of the clearing of old matches from the stacks in accordance with the present invention.

FIG. 7 is a flowchart illustrating an embodiment of the clearing of old matches from the stacks in accordance with the present invention. Here, a level number d is the input, via step 701, where all matches of a level greater than or equal to d will be removed from the stack. First, the level of a match m at the stack top of the match stack is checked, via step 702, to see if it is greater than or equal to d, via step 703. If so, then m is removed or popped from the match stack, via step 704. The logical stack top for the query node is also adjusted to point to a previous match.

Next, the logical stack top for the query node of m is checked to see if it is empty, via step 705. If it is not empty, then steps 702 through 705 are repeated for the next match in the match stack. If it is empty, then the indirect nodes of the query node of m are removed from the active states, via step 706.

The clearing is completed once all matches with levels greater than or equal to d have been popped off the match stack. Then, the matches for level d-1 are assigned to M, via step 707. Next, for each match m in M, the direct nodes of the query node of m are added to the direct AS hash table.

The method in accordance with the present invention is also applicable to an XPath query with predicates. The difference is that when there is a predicate, its value may only be available at the end of the node with which it is associated. Therefore, we cannot emit output nodes when they match with the output query node, but need to propagate them upward to verify the predicates are all true. If one of the predicates along the way from the matching unit to the root matching unit turns out to be false, the node has to be dropped.

When a node matches a query node, one or more basic attributes about the matching will be extracted. The basic attribute types are listed in Table 3 below. They may be the result of applying a predicate or a function on the node. For example, an attribute can be used to represent the result of a primitive predicate w>300, which is a Boolean and associated with query node labeled "w" as push-down predicate. The value of this attribute will be propagated to a query node where the primitive predicate is used, possibly combined with other predicates there.

TABLE 3

Basic types of attributes extracted from a node

| Type | Meaning |
|---|---|
| Boolean | true or false for existence test or result of a primitive predicate |
| number | Numeric value |
| string | String value |
| node | Node reference for use in sequences |

If a node matches a non-leaf query node, it may need to evaluate some aggregate attributes, such as the candidate result sequence (CRS), which contains nodes that matches the output query node but not yet fully filtered by the predicates, or the predicate truth value. Some of the aggregate attributes are listed in Table 4 below. For example, five attributes will be involved in predicate a<b, which is equivalent to min(a)<max(b), and attribute value(a) and value(b) associated with query nodes labeled a and b are kept, and aggregate attributes min(a) and max(b) associated with their previous steps, and propagated to an ancestor step where min(a)<max(b) is calculated as another attribute and consumed.

TABLE 4

Types of some aggregate attributes

| Type | Meaning |
|---|---|
| sequence | A sequence of nodes or values |
| max | The maximal value |

TABLE 4-continued

Types of some aggregate attributes

| Type | Meaning |
|---|---|
| min | The minimal value |
| distinct | Distinct values |
| sum | Summation of the values |
| last | The last value |
| count | Count of occurrences or position of matchings |
| tuple | A tuple of values, including sequences or tuples |

To evaluate an aggregate attribute for a matching from the values of matchings beneath it, the following framework is followed:

1. Init function, which initializes the attribute(s)
2. Extract function, which applies to each matched child or descendant node
3. Accumulate function, which evaluates new value(s) based on the current cumulative value(s) and new extracted value(s)
4. Final function, which is the final evaluation of an attribute that may be based on a set of attributes at the matching node.

For example, if we have a step with predicate a[b=10], there will be an attribute p for the predicate, with the following functions: (1) init: to false; (2) extract: e:=if number(b)=10 then true else false; (3) accumulate: p=p or e; (4) final: none. If the predicate is [b=10 and c>"ABC"], then the final could be to evaluate the "and". Notice that the above framework is the same as evaluating an aggregate function, such as average, where multiple attributes are defined to get the final result.

Sequence-valued attributes are fundamental in evaluation of XPath queries. Many other types of attributes are defined on node sequences. Therefore, we focus on value propagation of sequence-valued attributes here. We use figures to illustrate the principles instead of using formal notations.

A basic sequence-valued attribute is for the sequence of child nodes or descendant nodes. The logic to calculate such an attribute depends on the axis of a step, as shown in Table 5, where "U" means union of two sequences, which results in a new sequence with unique nodes from two sequences in document order. We used double lines for descendant axis.

TABLE 5

Propagation of basic sequence-valued attributes

| Path and matchings | Path, attributes, and propagations |
|---|---|
|  | Path: ... a/b<br>s: sequence of b children of a<br>Init: $s_1 := \epsilon$; // when $a_1$ is created<br>At end of $b_1$: $s_1 := s_1 \cup \{b_1\}$; // upward |
|  | Path: ... a/b<br>s: sequence of b children of a<br>Init: $s_i := \epsilon$; // when $a_i$ is created<br>At end of $b_j$: $s_i := s_i \cup \{b_j\}$; // upward<br>// no sideway propagation for s |

TABLE 5-continued

Propagation of basic sequence-valued attributes

| Path and matchings | Path, attributes, and propagations |
|---|---|
|  | Path: ... a//b<br>s: sequence of b descendants of a<br>t: sequence of b descendant-or-self of b<br>Init: $s_1 := \epsilon$; // when $a_1$ is created<br>$t_i := \{b_i\}$; // when $b_i$ is created<br>At end of $b_2$: $t_1 := t_1 \cup t_2$; // sideway<br>At end of $b_1$: $s_1 := s_1 \cup t_1$; // upward |
|  | Path: ... a//b<br>s: sequence of b descendants of a<br>t: sequence of b descendant-or-self of b<br>Init: $s_i := \epsilon$; // when $a_i$ is created<br>$t_i := \{b_i\}$; // when $b_i$ is created<br>At end of $b_i$: $s_i := s_i \cup t_i$; // upward<br>At end of $b_2$: $t_1 := t_1 \cup t_2$; // sideway |

Obviously an attribute for sequence of children is not transitive, while an attribute for sequence of descendant-or-self is transitive. When an attribute is transitive, its value is propagated sideway at the end as well as upward if there is an upward link. We note that in the last case of the above table, duplicate propagation can be avoided if we follow the rules:

For b: propagate upward if there is an upward link or else propagate sideway, and For a: propagate sideway and accumulate for b descendants of a.

This way, there are no duplicates and document order is guaranteed for b descendants of a using simple concatenation.

When there is a predicate, the rules need some change. If there is a predicate p for query node b, for all the cases in Table 3 (paths: . . . a/b[p], . . . a//b[p]), upward propagation is allowed only if the predicate p is true. If the predicate p is false, the matching unit is dropped, but it will allow sideway propagation to pass through. When a predicate p is associated with a in . . . a[p]//b, the sideway propagation of sequence of b descendants of a between a matching units is not affected by predicate p.

However, our goal is to propagate the so-called candidate result sequence (CRS) for On the other hand, a CRS attribute is transitive on a previous step of a descendant axis. This property is independent of whether the result query node has child axis or descendant axis. For example, for a query /a[u]/b[v]/c[w]//d, a sequence of d descendants can be propagated sideway at step c, but as a CRS, it cannot be propagated side way at step b or a. If we have query //a[u]//b[v]/c[w]//d/e, a CRS can be propagated at step c, a, or root, but not b.

If we follow basic attribute propagation, there may be duplicates. For example, for query //a[p]//b, sequences of b descendants of a propagated sideway between a matching units contain duplicate b nodes. To avoid duplicates, the sideway propagation will involve two kinds of sub-sequences: those with p as true, thus part of the final result, and those with p as false, and propagated to an ancestor a for possible true predicate p. If the predicate for one of the ancestors is true, they become part of the result, or otherwise are dropped.

A method for generating hierarchical path value index keys has been disclosed. The method generates hierarchical path index keys for single and multiple indexes with one scan of a document. Each data node of the document is scanned and matches to query nodes are identified. A data node matches a query node if the following three conditions hold: (1) if the current step is not the root, there is a match for the query node in the previous step of the query; (2) the data node matches the query node of the current step; and (3) the edges of the data and query nodes match. A sub-tree of a data node can be skipped if the data node whose level is less than the fix levels is not matched. The data node is then placed in the match stacks corresponding to the match query nodes. The method uses transitivity properties among matching units to reduce the number of states that need to be tracked and to improve the evaluation of path expressions significantly. The method is thus significantly more efficient than known approaches.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for generating hierarchical path value index keys from an XPath expression, the method comprising:
    scanning a plurality of data nodes of a document;
    building a tree of query nodes from the XPath expression;
    determining if each of the plurality of data nodes of the document matches corresponding query nodes associated with the tree of query nodes, including determining that each of the plurality of data nodes matches corresponding query nodes associated with the tree of query nodes responsive to
        a root query node associated with the tree of query nodes matching a root data node of the plurality of data nodes;
        names of the plurality of data nodes of the document matching names of the corresponding query nodes within the tree of query nodes; and
        relationships between the plurality of data nodes matching relationships between
    the corresponding query nodes within the tree of query nodes; and
    placing the plurality of data nodes that match the corresponding query nodes associated with the tree of query nodes in a match stack table, the plurality of data nodes placed in the match stack table representing the hierarchical path value index keys,
    otherwise outputting a result indicating that none of the plurality of data nodes of the document matches corresponding query nodes associated with the tree of query nodes responsive to that data nodes of the document not matching corresponding query nodes associated with the tree of query nodes,
    wherein determining if each of the plurality of data nodes of the document matches corresponding query nodes associated with the tree of query nodes further comprises
        clearing old matches from the match stack table;
        searching a direct active state hash table and an indirect active state hash table to identify active states with a same name as a given data node and placing the identified active states in a list;
        clearing direct active states in the direct active state hash table;

skipping descendants of a given data node if the list is empty and a level of the data node is less than a fixed level;

placing the data node in an output stream, if a corresponding query node in the list is a leaf node;

adding indirect nodes of the corresponding query node to an indirect active state hash table responsive to the corresponding query node not being the leaf node and the match stack table for the corresponding query node being empty; and pushing a match entry for the corresponding query node onto the match stack table and adding direct states of the corresponding query node to the direct active state hash table.

2. The method of claim 1, wherein relationships between the plurality of data nodes include parent-child (PC) relationships and ancestor-descendant (AD) relationships.

3. A computer readable medium encoded with a computer program for generating hierarchical path value index keys from an XPath expression, the computer program comprising computer executable code for:

scanning a plurality of data nodes of a document;

building a tree of query nodes from the XPath expression;

determining if each of the plurality of data nodes of the document matches corresponding query nodes associated with the tree of query nodes, including determining that each of the plurality of data nodes matches corresponding query nodes associated with the tree of query nodes responsive to a root query node associated with the tree of query nodes matching a root data node of the plurality of data nodes;

names of the plurality of data nodes of the document matching names of the corresponding query nodes within the tree of query nodes; and relationships between the plurality of data nodes matching relationships between the corresponding query nodes within the tree of query nodes; and placing the plurality of data nodes that match the corresponding query nodes associated with the tree of query nodes in a match stack table, the plurality of data nodes placed in the match stack table representing the hierarchical path value index keys, otherwise outputting a result indicating that none of the plurality of data nodes of the document matches corresponding query nodes associated with the tree of query nodes responsive to that data nodes of the document not matching corresponding query nodes associated with the tree of query nodes, wherein the computer executable code for determining if each of the plurality of data nodes of the document matches corresponding query nodes associated with the tree of query nodes further comprises computer executable code for clearing old matches from the match stack table;

searching a direct active state hash table and an indirect active state hash table to identify active states with a same name as a given data node and placing the identified active states in a list;

clearing direct active states in the direct active state hash table;

skipping descendants of a given data node if the list is empty and a level of the data node is less than a fixed level;

placing the data node in an output stream, if a corresponding query node in the list is a leaf node;

adding indirect nodes of the corresponding query node to an indirect active state hash table responsive to the corresponding query node not being the leaf node and the match stack table for the corresponding query node being empty; and pushing a match entry for the corresponding query node onto the match stack table and adding direct states of the corresponding query node to the direct active state hash table.

4. The computer readable medium of claim 3, wherein relationships between the plurality of data nodes include parent-child (PC) relationships and ancestor-descendant (AD) relationships.

* * * * *